(12) United States Patent
Gill et al.

(10) Patent No.: US 9,656,914 B2
(45) Date of Patent: May 23, 2017

(54) RHEOLOGY MODIFYING AGENTS FOR SLURRIES

(71) Applicant: Ecolab USA, Inc., Naperville, IL (US)

(72) Inventors: Jasbir Gill, Naperville, IL (US); Tzu Y Chen, Wheaton, IL (US); Reagan Faith, Cold Lake (CA); Adam Coulterman, Cold Lake (CA)

(73) Assignee: ECOLAB USA INC., Naperville, IL (US)

( * ) Notice: Subject to any disclaimer, the term of this patent is extended or adjusted under 35 U.S.C. 154(b) by 618 days.

(21) Appl. No.: 13/875,061

(22) Filed: May 1, 2013

(65) Prior Publication Data

US 2014/0326675 A1 Nov. 6, 2014

(51) Int. Cl.
| | | |
|---|---|---|
| *C01F 11/02* | (2006.01) |
| *C04B 2/00* | (2006.01) |
| *C02F 5/02* | (2006.01) |
| *C02F 5/08* | (2006.01) |
| *C02F 5/10* | (2006.01) |
| *C02F 1/52* | (2006.01) |
| *C01F 5/02* | (2006.01) |
| *C02F 1/00* | (2006.01) |
| *C01B 13/14* | (2006.01) |
| *B03D 3/00* | (2006.01) |
| *B01D 21/01* | (2006.01) |
| *C02F 5/00* | (2006.01) |

(52) U.S. Cl.
CPC .............. *C04B 2/00* (2013.01); *C01F 5/02* (2013.01); *C01F 11/02* (2013.01); *C02F 5/105* (2013.01); *C01P 2006/22* (2013.01); *C02F 5/00* (2013.01); *C02F 5/083* (2013.01); *C02F 2209/09* (2013.01)

(58) Field of Classification Search
None
See application file for complete search history.

(56) References Cited

U.S. PATENT DOCUMENTS

| | | |
|---|---|---|
| 2,178,139 A | 10/1939 | Epstein et al. |
| 2,202,601 A | 5/1940 | Ried |
| 4,230,610 A | 10/1980 | Falcione et al. |
| 4,385,961 A | 5/1983 | Svending et al. |
| 4,388,150 A | 6/1983 | Sunden et al. |
| 4,711,727 A * | 12/1987 | Matthews ............ C02F 1/5227 162/164.6 |
| 4,743,396 A | 5/1988 | Fong et al. |
| 4,753,710 A | 6/1988 | Langley et al. |
| 4,913,775 A | 4/1990 | Langley et al. |
| 4,966,652 A | 10/1990 | Wasser |
| 5,098,520 A | 3/1992 | Begala |
| 5,254,221 A | 10/1993 | Lowry et al. |
| 5,264,009 A * | 11/1993 | Khan .................. C02F 11/06 110/346 |
| 5,274,055 A | 12/1993 | Honig et al. |
| 5,840,158 A | 11/1998 | Choo et al. |
| 5,877,247 A | 3/1999 | Mahar |
| 6,071,379 A | 6/2000 | Wong Shing et al. |
| 6,361,652 B2 | 3/2002 | Keiser et al. |
| 6,361,653 B2 | 3/2002 | Keiser et al. |
| 6,372,805 B1 | 4/2002 | Keiser et al. |
| 6,486,216 B1 | 11/2002 | Keiser et al. |
| 6,592,718 B1 | 7/2003 | Wong Shing et al. |
| 6,605,674 B1 | 8/2003 | Whipple et al. |
| 7,473,334 B2 | 1/2009 | Wong Shing et al. |
| 7,615,135 B2 | 11/2009 | Harrington et al. |
| 7,718,085 B1 | 5/2010 | Scheurman, III |
| 8,021,518 B2 | 9/2011 | Furman et al. |
| 8,066,847 B2 | 11/2011 | Grigoriev et al. |
| 8,071,667 B2 | 12/2011 | Furman, Jr. et al. |
| 8,088,213 B2 | 1/2012 | Cheng et al. |
| 8,092,618 B2 | 1/2012 | Sharpe et al. |
| 8,101,045 B2 | 1/2012 | Furman et al. |
| 8,172,983 B2 | 5/2012 | Cheng et al. |
| 8,246,780 B2 | 8/2012 | Duggirala et al. |
| 8,262,852 B2 | 9/2012 | Duggirala et al. |
| 8,262,858 B2 | 9/2012 | Duggirala et al. |
| 8,298,439 B2 | 10/2012 | Blubaugh et al. |
| 8,366,877 B2 | 2/2013 | Duggirala et al. |
| 8,382,950 B2 | 2/2013 | Cheng |
| 8,414,739 B2 | 4/2013 | Kimura et al. |
| 8,465,623 B2 | 6/2013 | Zhao et al. |
| 2008/0206126 A1* | 8/2008 | Benson .................. C01F 11/02 423/517 |
| 2009/0173692 A1 | 7/2009 | Laraway et al. |
| 2010/0313619 A1* | 12/2010 | Biotteau ............... C02F 1/56 71/13 |
| 2015/0041091 A1 | 2/2015 | Castro et al. |
| 2015/0072902 A1 | 3/2015 | Lafitte et al. |

FOREIGN PATENT DOCUMENTS

| | | | | |
|---|---|---|---|---|
| CN | 102180979 A | 9/2011 | | |
| EP | 0594332 A1 * | 4/1994 | ............... C01F 11/02 |
| WO | WO 02/092701 A1 | 11/2002 | | |
| WO | WO 2008/033283 A1 | 3/2008 | | |
| WO | WO 2010/134868 A1 | 11/2010 | | |

OTHER PUBLICATIONS

International Search Report and Written Opinion dated Aug. 26, 2014 for International Application No. PCT/US2014/035099.

(Continued)

*Primary Examiner* — Joseph Drodge
*Assistant Examiner* — Clare Perrin
(74) *Attorney, Agent, or Firm* — Eric D. Babych; Brinks Gilson & Lione

(57) ABSTRACT

Rheology modifying agents and methods of modifying the rheology of a slurry are disclosed, in addition to methods for the prevention of fouling. The slurry can be a lime slurry or a magnesium oxide slurry. The rheology modifying agent can be a low molecular weight anionic polymer, a high molecular weight polymer, a mixture of a low molecular weight anionic polymer and a high molecular weight polymer, a mixture of a high molecular weight polymer and a chelating agent, and a mixture of a chelating agent, a high molecular weight polymer, and a low molecular weight anionic polymer.

12 Claims, No Drawings

(56) References Cited

OTHER PUBLICATIONS

International Search Report for PCT/US2014/049614, mailed Nov. 18, 2014, 3 pages.
International Search Report for PCT/2016/057001, mailed Jan. 23, 2017, 4 pages.
Peel, John D. "Paper Science and Paper Manufacture." Vancouver, BC: Angus Wilde Publications Inc., 1999, p. 90.
Smook, Gary A. "Handbook for Pulp & Paper Technologists, Second Edition." Vancouver, BC: Angus Wilde Publications Inc., 1992, p. 283.

* cited by examiner

RHEOLOGY MODIFYING AGENTS FOR SLURRIES

CROSS-REFERENCE TO RELATED APPLICATIONS

Not Applicable

FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

The present disclosure generally relates to various rheology modifying agents useful for modifying the rheology of slurries. More particularly, the present disclosure relates to rheology modifying agents useful for modifying the rheology of lime slurries and magnesium oxide slurries.

2. Description of the Related Art

Slurries of lime and magnesium oxide are commonly added to lime and warm lime softeners to treat water hardness (i.e. remove hard water ions) and to assist in silica removal. If these ions are not removed from the water, the subsequent equipment coming into contact with the water will obtain hard water deposits and fouling of the equipment will occur. Hard water fouling can occur in, for example, heat exchangers, evaporators, and boilers. Heat exchangers, evaporators, and boilers can be used to produce hot water or steam that can be used in various processes, such as hydrocarbon production and power generation. Further, lime and magnesium oxide slurries can also be added to scrubbers to assist with the scrubbing of acid gasses, such as $SO_2$, $H_2S$, and $CO_2$, and magnesium oxide slurries can be used for adjusting pH during waste water treatment.

Feed lines are used to transport the slurries to the various pieces of equipment used in the processes. Without proper treatments for the lime and magnesium oxide slurries, the lime and magnesium can form deposits in the feed lines, thereby reducing the slurry feed flow, and eventually plugging or clogging the feed line. Once clogged, the hard deposits in the feed lines are typically removed or dissolved by cleaning the feed lines with acids, such as HCl, which is not safe and not easy to handle. Moreover, such an acid treatment requires special procedures for waste disposal.

Prior art methods used to clean clogged feed lines are thus dangerous and costly, and require extended periods of down time. When a slurry feed line becomes clogged, the entire operation needs to be shut down, the feed lines need to be taken off line, and subsequently cleaned with the acid. In certain processes, these steps must be repeated, sometimes as frequently as once a week, thereby greatly increasing the total time needed to achieve the intended goal of the overall process, such as hydrocarbon production. Therefore, there is a need for chemical treatments that will reduce or inhibit lime and magnesium oxide deposits in slurry feed lines so the feed lines do not need to be taken off line and cleaned.

BRIEF SUMMARY OF THE INVENTION

Rheology modifying agents and methods of modifying the rheology of slurries are disclosed herein. In one aspect, a method of modifying the rheology of a lime slurry is disclosed. The method comprises the steps of providing a lime slurry; and adding a rheology modifying agent to the lime slurry, wherein the rheology modifying agent comprises a member selected from the group consisting of a low molecular weight anionic polymer, a high molecular weight polymer, a mixture of a low molecular weight anionic polymer and a high molecular weight polymer, a mixture of a chelating agent and a high molecular weight polymer, and a mixture of a chelating agent, a high molecular weight polymer, and a low molecular weight anionic polymer.

In an additional aspect, a method of modifying the rheology of a magnesium oxide slurry is disclosed. The method comprises the steps of providing a magnesium oxide slurry; and adding a rheology modifying agent to the magnesium oxide slurry, wherein the rheology modifying agent comprises a member selected from the group consisting of a low molecular weight anionic polymer, a mixture of a low molecular weight anionic polymer and a high molecular weight polymer, and a mixture of a chelating agent, a high molecular weight polymer, and a low molecular weight anionic polymer.

In another aspect, a method of preventing fouling during a hydrocarbon production process is disclosed. The method comprises the steps of providing a lime slurry; adding a rheology modifying agent to the lime slurry to form a mixture, wherein the rheology modifying agent comprises a member selected from the group consisting of a low molecular weight anionic polymer, a high molecular weight polymer, a mixture of a low molecular weight anionic polymer and a high molecular weight polymer, a mixture of a chelating agent and a high molecular weight polymer, and a mixture of a chelating agent, a high molecular weight polymer, and a low molecular weight anionic polymer; transporting the mixture through a feed line to a warm lime softener; and preventing fouling in the feed line.

In yet a further aspect, an alternate method of preventing fouling during a hydrocarbon production process is disclosed. The method comprises the steps of providing a magnesium oxide slurry; adding a rheology modifying agent to the magnesium oxide slurry to form a mixture, wherein the rheology modifying agent comprises a member selected from the group consisting of a low molecular weight anionic polymer, a mixture of a low molecular weight anionic polymer and a high molecular weight polymer, and a mixture of a chelating agent, a high molecular weight polymer, and a low molecular weight anionic polymer; transporting the mixture through a feed line to a piece of equipment; and preventing fouling in the pipeline.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

Not Applicable.

DETAILED DESCRIPTION OF THE INVENTION

The present disclosure relates compositions and methods useful for modifying the rheology of slurries. In certain aspects, the slurries are lime slurries. "Lime" can interchangeably be referred to as calcium oxide or CaO. In other aspects, the slurries are magnesium oxide slurries. In addition to magnesium oxide slurries, the presently disclosed rheology modifying agents are also effective with modifying the rheology of magnesium hydroxide slurries.

With respect to lime slurries, it is well-known that these slurries can become highly viscous or, in certain situations, they can essentially solidify. Moreover, they can form deposits on the feed lines used for their transportation and they can also completely plug the feed lines, thereby requiring the overall process to be shut down and the feed lines to be cleaned manually or with an acid treatment. In accordance with the present disclosure, various rheology modifying agents are disclosed that can beneficially modify the rheology of these lime slurries, thereby inhibiting or minimizing deposit formation and feed line clogging.

In one aspect, a rheology modifying agent is added to the lime slurry to modify its rheology. In some aspects, the rheology modifying agent can comprise one or more high molecular weight polymers. In other aspects, the rheology modifying agent can comprise a low molecular weight anionic polymer. In further aspects, the rheology modifying agent can comprise a high molecular weight polymer and a chelating agent. In still other aspects, the rheology modifying agent can comprise a high molecular weight polymer and a low molecular weight anionic polymer. In additional aspects, the rheology modifying agent can comprise a high molecular weight polymer, a chelating agent, and a low molecular weight anionic polymer. In accordance with the present disclosure, the terms "polymer" or "polymers" are intended to include homopolymers, copolymers of two or more monomers, terpolymers, etc.

Generally, the high molecular weight polymer has a number average molecular weight of greater than about 200,000. In certain aspects, the high molecular weight polymer has a molecular weight of less than about 50,000. In additional aspects, the high molecular weight polymer has a molecular weight of greater than about 500,000. In some aspects, the high molecular weight polymer has a molecular weight of greater than about 750,000, and in other aspects, the high molecular weight polymer has a molecular weight of greater than about 1,000,000.

The amount of the rheology modifying agent to be added to the lime slurry depends at least upon the amount of lime in the slurry. For example, a certain dosage of the rheology modifying agent may be added to a 10% lime slurry and a different dosage could be added to a 30% lime slurry. In general, the amount of the rheology modifying agent added to the lime slurry is about 0.1 ppm to about 300 ppm, based on active polymer. In other aspects, the amount can be from about 1 ppm to about 100 ppm, based on active polymer. In further aspects, the amount can be from about 2 ppm to about 70 ppm, based on active polymer. If the rheology modifying agent comprises a chelating agent, the foregoing amounts would remain the same.

In certain aspects, the high molecular weight polymer is a copolymer of acrylic acid and acrylamide. The high molecular weight copolymer of acrylic acid and acrylamide can include any monomer ratio, such as from about 1% to about 15% acrylic acid monomers and about 99% to about 85% acrylamide monomers. Copolymers can include as much as about 95% acrylic acid and as low as about 5% acrylamide. For example, a high molecular weight copolymer could include about 90% acrylic acid and about 10% acrylamide. In one aspect, the copolymer comprises about 3% acrylic acid and about 97% acrylamide. The foregoing copolymers can have molecular weights of less than about 50,000 in certain aspects, in excess of about 200,000 in some aspects, in excess of about 1,000,000 in other aspects, in excess of about 5,000,000 in additional aspects, in excess of about 10,000,000 in further aspects, and in excess of about 15,000,000 in other aspects. For example, if the copolymer comprises about 3% acrylic acid and about 97% acrylamide, the polymer can have a molecular weight in excess of 15,000,000. Additionally, if the copolymer comprises about 90% acrylic acid and about 10% acrylamide, the polymer can have a molecular weight of less than about 50,000. In other aspects, the high molecular weight polymer can be a hydrolyzed polyacrylamide. The hydrolyzed polyacrylamide can have a molecular weight of greater than about 200,000 and in certain aspects, the molecular weight is greater than about 1,000,000.

Furthermore, in certain aspects, a chelating agent or chelant is added with the high molecular weight polymer to the lime slurry. Thus, a rheology modifying agent can be added to the lime slurry and the rheology modifying agent may comprise any amount of a high molecular weight polymer and any amount of a chelating agent. In certain aspects, this rheology modifying agent can also comprise a low molecular weight anionic polymer. Chelating agents are commonly known in the art and any chelating agent can be selected by one of skill in the art and used in connection with the present disclosure. In certain aspects, the chelating agent is selected from ethylenediaminetetraacetic acid (EDTA), citric acid, lingo sulfonates, dimercaprol (2,3-dimercapto-1-propanol), prophine, and any combination thereof. In one specific aspect, the chelating agent is EDTA.

Thus, in certain aspects of the present disclosure, a rheology modifying agent can be added to a lime slurry, wherein the rheology modifying agent comprises a chelating agent and a high molecular weight copolymer of acrylic acid and acrylamide. The rheology modifying agent can comprise from about 40% to about 60% of the chelating agent and from about 60% to about 40% of the high molecular weight polymer. Any of the aforementioned copolymers of acrylic acid and acrylamide can be used, the copolymer can have any of the aforementioned monomer ratios, the rheology modifying agent can comprise any amounts of the chelating agent and copolymer, and the chelating agent can be any chelating agent known in the art, such as EDTA. As previously mentioned, the rheology modifying agent can also comprise a low molecular weight anionic polymer.

In other aspects, the rheology modifying agent to be added to the lime slurry can comprise a chelating agent and a high molecular weight hydrolyzed polyacrylamide. The rheology modifying agent can comprise about 40% to about 60% of the chelating agent and about 60% to about 40% of the high molecular weight polymer. The hydrolyzed polyacrylamide can have a molecular weight of greater than about 200,000 and in certain aspects, the molecular weight is greater than about 1,000,000. In an aspect, the rheology modifying agent comprises about 1% to about 10% hydrolyzed polyacrylamide and about 0.1% to about 5% of the chelating agent. In a particular aspect, the rheology modifying agent comprises about 1.6% of the hydrolyzed polyacrylamide and about 0.4% of ethylenediaminetetraacetic acid. As previously mentioned, the rheology modifying agent can also comprise a low molecular weight anionic polymer.

In additional aspects of the present disclosure, the rheology modifying agent to be added to the lime slurry can comprise a low molecular weight anionic polymer. In certain aspects, the low molecular weight anionic polymer has a number average molecular weight within the range of about 1,000 to about 20,000. In further aspects, the low molecular weight anionic polymers can have molecular weights of between about 2,000 and about 15,000 and also between about 2,000 and about 5,000.

Various low molecular weight anionic polymers are contemplated by the present application to be used as rheology modifying agents. In one aspect, the low molecular weight anionic polymer is an acrylic acid/acrylamide/sulfonated acrylamide terpolymer. Any monomer ratio can be used in this terpolymer. For example, acrylic acid can be present in the terpolymer from about 5% to about 95%, acrylamide can be present in the terpolymer from about 5% to about 95%, and sulfonated acrylamide can be present in the terpolymer from about 5% to about 95%. In one aspect, the monomer ratio of acrylic acid:acrylamide:sulfonated acrylamide is about 40:20:40, respectively. In another aspect, the low molecular weight anionic polymer is an acrylic acid polymer, optionally having a molecular weight below 5,000. In a further aspect, the low molecular weight anionic polymer is a copolymer of acrylic acid/2-Acrylamido-2-methylpropane sulfonic acid. Any monomer ratio can be used in this copolymer. For example, the copolymer can comprise from about 5% to about 95% acrylic acid and from about 5% to about 95% 2-Acrylamido-2-methylpropane sulfonic acid. In one specific aspect, the copolymer comprises a monomer ratio of acrylic acid to 2-Acrylamido-2-methylpropane sulfonic acid of about 60:40, respectively. Additional examples of low molecular weight anionic polymer rheology modifying agents are blends of polymaleic acid with copolymers of AA/AMPS, polymaleic acid polymers, and copolymers of polymaleic acid and acrylic acid. As previously mentioned, in addition to the low molecular weight anionic polymer, the rheology modifying agent can also comprise a high molecular weight polymer and optionally a chelating agent.

As discussed above, the aforementioned rheology modifying agents can be added to any process incorporating lime slurries. Such processes can include processes incorporating warm lime softeners, hot lime softeners, or any other process where hard water ions are being removed from water. Also, the foregoing rheology modifying agents can be added to processes utilizing heat exchangers, evaporators, and boilers, such as hydrocarbon production processes and power generation processes. Further, the foregoing rheology modifying agents can be added to scrubbers to assist with the scrubbing of acid gasses, such as $SO_2$, $H_2S$, and $CO_2$.

In one aspect, a method of modifying the rheology of a lime slurry is disclosed. The method can include the steps of providing a lime slurry and adding a rheology modifying agent to the lime slurry. The lime slurry can be stored in a storage device. The rheology modifying agent can be added into the slurry in the storage device. In certain aspects, the rheology modifying agent comprises any of the aforementioned high molecular weight polymers. In certain aspects, the rheology modifying agent can comprise any of the aforementioned low molecular weight anionic polymers. In additional aspects, the rheology modifying agent can comprise any of the aforementioned high molecular weight polymers in combination with a chelating agent. Further, the rheology modifying agent can comprise any of the aforementioned high molecular weight polymers, any of the aforementioned low molecular weight anionic polymers, and a chelating agent.

In one aspect, the rheology modifying agent comprises about 1% to about 10% hydrolyzed polyacrylamide and about 0.1% to about 5% of the chelating agent. In another aspect, the rheology modifying agent comprises a high molecular weight copolymer of acrylic acid and acrylamide wherein the copolymer comprises about 1% to about 15% acrylic acid monomers and about 99% to about 85% acrylamide monomers. In a further aspect, the rheology modifying agent comprises a low molecular weight poly acrylic acid. In an additional aspect, the rheology modifying agent comprises a terpolymer comprising acrylic acid:acrylamide:sulfonated acrylamide. In another aspect, the rheology modifying agent comprises a polymaleic acid polymer.

In an additional aspect, a method of preventing fouling during a hydrocarbon production process is disclosed. The method can include the steps of providing a lime slurry and adding a rheology modifying agent to the lime slurry to form a mixture. In certain aspects, the rheology modifying agent can comprise any of the foregoing high molecular weight polymers. Also, the rheology modifying agent may comprise any of the foregoing chelating agents in combination with any of the foregoing high molecular weight polymers. Additionally, the rheology modifying agent may comprise any of the foregoing low molecular weight anionic polymers or, alternatively, the rheology modifying agent can comprise a combination of a low molecular weight anionic polymer, a high molecular weight polymer, and a chelating agent. The method further includes the step of transporting the mixture through a feed line to a warm lime softener. Since the mixture comprises an aspect of the presently disclosed rheology modifying agents, lime deposits on the feed line will be prevented or highly reduced such that the operation can continue without having to shut down the process to clean fouled feed lines.

In certain hydrocarbon production processes, a pond or similar water storage device is provided to store water (hereinafter "production water") to be used in connection with recovering hydrocarbons. This production water can come from many different sources and generally is not purified. Thus, the production water can contain high amounts of silica. The production water is fed into a warm lime softener to remove contaminants, such as silica. In certain operations, lime slurries and/or magnesium oxide slurries are also fed into the warm lime softener. The lime and/or magnesium oxide slurries assist in silica removal. For example, the silica is able to precipitate onto the magnesium oxide or lime. In certain situations, the pH of the medium inside of the warm lime softener is raised to facilitate silica precipitation. The precipitate is then separated from the water and the water can be fed from the warm lime softener to the next piece of equipment, such as the heat exchanger or the steam generator.

However, as previously mentioned, although lime slurries and magnesium oxide slurries provide the benefit of facilitating silica removal from the production water, the slurries can also form deposits on the feed lines used to feed the slurries into the warm lime softener. In certain aspects, a storage device is provided near the warm lime softener. The storage device can contain the lime slurry. In other aspects, a storage device is provided near the warm lime softener. The storage device can contain the magnesium oxide slurry. In further aspects, two or more storage devices are provided near the warm lime softener. At least one of the storage devices contains the lime slurry and at least one of the storage devices contains a magnesium oxide slurry. Feed lines connect the lime slurry and magnesium oxide slurry storage devices to the warm lime softener. Additionally, the feed lines are used to transport the lime slurry and magnesium oxide slurry from their respective storage devices to the warm lime softener. As discussed above, these feed lines will become fouled with lime and/or magnesium oxide deposits and after about one week to one month, the entire operation will need to be shut down and the feed lines will need to be cleaned either manually or with an acid. However, if any of the aforementioned rheology modifying agents are added to the lime slurry, feed line deposits will not occur or they will be greatly reduced. The rheology modifying agent to be added to the magnesium oxide slurry will be further discussed below.

As previously noted, the processes contemplated by the present application can incorporate both lime slurries and magnesium oxide or magnesium hydroxide slurries. All of the rheology modifying agents discussed below can be interchangeably used with magnesium oxide slurries and magnesium hydroxide slurries. For ease of understanding, the chemistry will be described in connection with magnesium oxide slurries.

The present disclosure contemplates an assortment of rheology modifying agents to be added to a magnesium oxide slurry. In one aspect, one or more of the previously disclosed low molecular weight anionic polymers is added to the magnesium oxide slurry to modify its rheology and prevent it from fouling the feed line that will be used for its transportation. In other aspects, a combination of any of the foregoing low molecular weight anionic polymers and any of the foregoing high molecular weight polymers can be added to slurry. In a further aspect, the rheology modifying agent to be added to the magnesium oxide slurry can comprise any of the foregoing low molecular weight anionic polymers, any of the foregoing high molecular weight polymers, and any of the presently disclosed chelating agents.

For example, in one aspect, the rheology modifying agent to be added to the magnesium oxide slurry comprises a combination of a composition comprising about 1% to about 10% hydrolyzed polyacrylamide and about 0.1% to about 5% of a chelating agent with a composition comprising a blend of polymaleic acid with an AA/AMPS copolymer. In another aspect, the rheology modifying agent comprises a low molecular weight poly acrylic acid. In an additional aspect, the rheology modifying agent comprises a terpolymer comprising acrylic acid:acrylamide:sulfonated acrylamide. In another aspect, the rheology modifying agent comprises a blend of polymaleic acid with an AA/AMPS copolymer and, in an additional exemplary aspect, the rheology modifying agent comprises an AA/AMPS copolymer.

The amount of rheology modifying agent to be added to the magnesium oxide slurry can be selected based upon the characteristics of the slurry. In certain aspects, one could add from about 10 to about 300 ppm of rheology modifying agent to the slurry. In another aspect, one could add about 30 to about 250 ppm of rheology modifying agent to the slurry.

As discussed above, the aforementioned rheology modifying agents can be added to any process incorporating magnesium oxide slurries. Such processes can include processes incorporating warm lime softeners, hot lime softeners, or any other process where hard water ions are being removed from water. Also, the foregoing rheology modifying agents can be added to processes utilizing heat exchangers, evaporators, and boilers, such as hydrocarbon production processes and power generation processes. Further, the foregoing rheology modifying agents can be added to scrubbers to assist with the scrubbing of acid gasses, such as $SO_2$, $H_2S$, and $CO_2$.

In one aspect, a method of modifying the rheology of a magnesium oxide slurry is disclosed. The method can include the steps of providing a magnesium oxide slurry and adding a rheology modifying agent to the magnesium oxide slurry. The magnesium oxide slurry can be stored in a storage device. The rheology modifying agent can be added into the slurry in the storage device. The rheology modifying agent can include any of the aforementioned low molecular weight anionic polymers. The rheology modifying agent can also comprise any of the aforementioned low molecular weight anionic polymers in combination with any of the aforementioned high molecular weight polymers. Further, the rheology modifying agent can comprise a combination of any of the aforementioned low molecular weight anionic polymers, any of the aforementioned high molecular weight polymers, and any of the aforementioned chelating agents.

In an additional aspect, a method of preventing fouling during a hydrocarbon production process is disclosed. The method can include the steps of providing a magnesium oxide slurry and adding a rheology modifying agent to the magnesium oxide slurry to form a mixture. In certain aspects, the rheology modifying agent can comprise any of the foregoing low molecular weight anionic polymers alone, or in combination with any of the aforementioned high molecular weight polymers and optionally any of the aforementioned chelating agents. The method further includes the step of transporting the mixture through a feed line to a piece of equipment. The piece of equipment can be, for example, a warm lime softener, a heat exchanger, and/or an evaporator. Since the mixture comprises a presently disclosed rheology modifying agent, deposits on the feed line will be prevented or highly reduced such that the operation can continue without having to shut down the process to clean fouled feed lines.

As described above, in certain hydrocarbon production processes, a pond or similar water storage device is provided to store production water to be used in connection with recovering hydrocarbons. This production water can come from many different sources and generally is not purified and can contain high amounts of silica. Thus, the production water is fed into a warm lime softener to remove contaminants and lime slurries and/or magnesium oxide slurries can also be fed into the warm lime softener. The lime and/or magnesium oxide slurries assist in silica removal. For example, the silica is able to precipitate onto the magnesium oxide or lime. In certain situations, the pH of the medium inside of the warm lime softener is raised to facilitate silica precipitation. The precipitate is then separated from the water and the water can be fed from the warm lime softener to the next piece of equipment, such as the heat exchanger or the steam generator.

However, as previously mentioned, although lime slurries and magnesium oxide slurries provide the benefit of facilitating silica removal from the production water, the slurries can also form deposits on the feed lines used to feed the slurries into the warm lime softener. In certain aspects, a storage device is provided near the warm lime softener. The storage device can contain the magnesium oxide slurry. In other aspects, a storage device is provided near the warm lime softener. The storage device can contain the lime slurry. In further aspects, two or more storage devices are provided near the warm lime softener. At least one of the storage devices contains the lime slurry and at least one of the storage devices contains a magnesium oxide slurry. Feed lines connect the lime slurry and magnesium oxide slurry storage devices to the warm lime softener. Additionally, the feed lines are used to transport the lime slurry and magnesium oxide slurry from their respective storage devices to the warm lime softener. As discussed above, these feed lines will become fouled with lime and/or magnesium oxide deposits and after about one week to one month, the entire operation will need to be shut down and the feed lines will need to be cleaned either manually or with an acid. However, if one or more of the aforementioned rheology modifying agents are added to the lime and/or magnesium oxide slurry, feed line deposits will not occur or they will be greatly reduced.

In a further aspect, a method of preventing fouling in a heat exchanger/evaporator is disclosed. Heat exchangers/evaporators are commonly used in hydrocarbon production. In one aspect of the method, production water from a pond, for example, can be injected into the heat exchanger and, as previously mentioned, since the production water can contain high levels of contaminants, such as silica, the heat exchanger can become fouled. A storage device can be located near the heat exchanger and the storage device can contain a magnesium oxide slurry. The magnesium oxide slurry can be fed into the heat exchanger using a feed line to reduce heat exchanger fouling by facilitating silica precipitation onto the magnesium oxide. In addition to silica, other minerals in the water can also precipitate onto the magnesium oxide. The addition of magnesium oxide also increases the pH of the aqueous medium, which further facilitates silica and other mineral precipitation. However, as described above, the magnesium oxide slurry feed line will become fouled and eventually plugged due to magnesium oxide deposits. Thus, the method also contemplates adding one or more of the previously disclosed rheology modifying agents into the magnesium oxide slurry, thereby inhibiting fouling, or greatly decreasing fouling.

For example, in one aspect, the rheology modifying agent to be added to the magnesium oxide slurry comprises a combination of a composition comprising about 1% to about 10% hydrolyzed polyacrylamide and about 0.1% to about 5% of a chelating agent with a composition comprising a blend of polymaleic acid with an AA/AMPS copolymer. In another aspect, the rheology modifying agent comprises a low molecular weight poly acrylic acid. In an additional aspect, the rheology modifying agent comprises a terpolymer comprising acrylic acid: acrylamide: sulfonated acrylamide. In another aspect, the rheology modifying agent comprises a blend of polymaleic acid with an AA/AMPS copolymer and, in an additional exemplary aspect, the rheology modifying agent comprises an AA/AMPS copolymer.

EXAMPLES

The following examples illustrate the beneficial technical effects of the presently disclosed rheology modifying agents. In a first set of experiments, a 9% lime slurry was added to 6 separate graduated cylinders. No rheology modifying agent was added to graduated cylinder number 1. However, rheology modifying agents were added to graduated cylinders 2-6. With respect to Table 1, Additive A was added to graduated cylinders 2-5 in the amounts shown. Additive B was added to graduated cylinder 6 in the amount shown in Table 1. The slurries in the graduated cylinders were subsequently allowed to stand (set) for 6 hours. Next, the graduated cylinders were covered and inverted. The foregoing procedures were carried to obtain the data shown in Tables 1-4, although different setting times were used as indicated, different additives were used as indicated, etc. The total number of inversions necessary to completely disperse the lime or magnesium oxide slurry in the graduated cylinder is indicated in the Tables. In certain situations, the slurries never became completely dispersed. A lower number of inversions equates to a more effective rheology modifying agent. In the Tables, the rheology modifying agents added to the graduated cylinders are defined as follows:

Additive A=a copolymer of acrylic acid/acrylamide (monomer ratio 3/97) having a molecular weight in excess of 15,000,000, containing 28% active polymer.
Additive B=a composition comprising 1.6% hydrolyzed polyacrylamide (molecular weight in excess of 1,000,000) and 0.4% EDTA.
Additive C=a blend of 18% Polymaeic acid and 12% copolymer of AA/AMPS with a total active of 30%.
Additive D=28% AA/AMPS copolymer.
Additive E=42% active low molecular weight (<5000) poly acrylic acid.
Additive F=terpolymer comprising acrylic acid:acrylamide: sulfonated acrylamide (monomer ratio of 40:20:40).
Additive G=50% active polymaleic acid polymer.
Additive H=50% active copolymer of polymaleic acid/acrylic acid (monomer ratio 50/50).

TABLE 1

9% Lime Slurry; Setting time = 6 hours

| | Slurry | Additive Product | Additive Dasage (ppm) | Setting Time (Hours) | No. Of Inversions for 100% Dispersed |
|---|---|---|---|---|---|
| Cylinder 1 | 9% Lime | N/A | N/A | 6 | 24 |
| Cylinder 2 | 9% Lime | Additive A | 0.71 | 6 | 17 |
| Cylinder 3 | 9% Lime | Additive A | 1.78 | 6 | 11 |
| Cylinder 4 | 9% Lime | Additive A | 3.57 | 6 | 11 |
| Cylinder 5 | 9% Lime | Additive A | 7.14 | 6 | 14 |
| Cylinder 6 | 9% Lime | Additive B | 100 | 6 | 14 |

TABLE 2

9% Lime Slurry, Setting time = 48.5 hours

| Slurry | Additive 1 Product | Additive 1 Dasage (ppm) | Additive 2 Product | Additive 2 Dosage (ppm) | Setting Time (Hours) | No. Of Inversions for 100% Dispersed |
|---|---|---|---|---|---|---|
| 9% Lime | N/A | N/A | N/A | N/A | 48.5 | 79 |
| 9% Lime | Additive C | 80 | N/A | N/A | 48.5 | 51 |

TABLE 2-continued

9% Lime Slurry, Setting time = 48.5 hours

| Slurry | Additive 1 Product | Additive 1 Dosage (ppm) | Additive 2 Product | Additive 2 Dosage (ppm) | Setting Time (Hours) | No. Of Inversions for 100% Dispersed |
|---|---|---|---|---|---|---|
| 9% Lime | Additive C | 160 | N/A | N/A | 48.5 | 57 |
| 9% Lime | Additive C | 240 | N/A | N/A | 48.5 | 30 |
| 9% Lime | Additive D | 33.4 | N/A | N/A | 48.5 | 31 |
| 9% Lime | Additive D | 66.8 | N/A | N/A | 48.5 | 50 |
| 9% Lime | Additive D | 100.2 | N/A | N/A | 48.5 | 55 |
| 9% Lime | Additive E | 22.2 | N/A | N/A | 48.5 | 27 |
| 9% Lime | Additive E | 44.4 | N/A | N/A | 48.5 | 16 |
| 9% Lime | Additive E | 66.6 | N/A | N/A | 48.5 | 29 |
| 9% Lime | Additive F | 23.5 | N/A | N/A | 48.5 | 29 |
| 9% Lime | Additive F | 47 | N/A | N/A | 48.5 | 18 |
| 9% Lime | Additive F | 70.5 | N/A | N/A | 48.5 | 29 |
| 9% Lime | Additive G | 25.3 | N/A | N/A | 48.5 | 52 |
| 9% Lime | Additive G | 50.6 | N/A | N/A | 48.5 | 41 |
| 9% Lime | Additive G | 75.9 | N/A | N/A | 48.5 | 23 |
| 9% Lime | Additive H | 23.5 | N/A | N/A | 48.5 | 40 |
| 9% Lime | Additive H | 47.1 | N/A | N/A | 48.5 | 44 |
| 9% Lime | Additive H | 70.6 | N/A | N/A | 48.5 | 34 |
| 9% Lime | Additive C | 80 | Additive B | 100 | 48.5 | 49 |
| 9% Lime | Additive D | 33.4 | Additive B | 100 | 48.5 | 77 |
| 9% Lime | Additive E | 22.2 | Additive B | 100 | 48.5 | 57 |
| 9% Lime | Additive F | 23.5 | Additive B | 100 | 48.5 | 80 |
| 9% Lime | Additive G | 25.3 | Additive B | 100 | 48.5 | 43 |
| 9% Lime | Additive H | 23.5 | Additive B | 100 | 48.5 | 38 |
| 9% Lime | Additive B | 100 | N/A | N/A | 48.5 | 19 |
| 9% Lime | Additive B | 20 | N/A | N/A | 48.5 | 63 |
| 9% Lime | Additive A | 1.79 | N/A | N/A | 48.5 | 30 |
| 9% Lime | Additive A | 0.18 | N/A | N/A | 48.5 | 44 |

TABLE 3

4% Magnesium oxide slurry, Setting time = 15 hours

| Slurry | Additive 1 Product | Additive 1 Dosage (ppm) | Additive 2 Product | Additive 2 Dosage (ppm) | Setting Time (Hours) | % Dispersed with 50 Inversions |
|---|---|---|---|---|---|---|
| 4% MgO | None | 0 | None | 0 | 15 | <10% |
| 4% MgO | Additive C | 80 | N/A | N/A | 15 | 33% |
| 4% MgO | Additive C | 160 | N/A | N/A | 15 | 50% |
| 4% MgO | Additive C | 240 | N/A | N/A | 15 | 100% with 28 Inversions |
| 4% MgO | Additive D | 33.4 | N/A | N/A | 15 | 16% |
| 4% MgO | Additive D | 66.9 | N/A | N/A | 15 | 58% |
| 4% MgO | Additive D | 100.3 | N/A | N/A | 15 | 100% with 27 Inversions |
| 4% MgO | Additive E | 22.2 | N/A | N/A | 15 | 15% |
| 4% MgO | Additive E | 44.4 | N/A | N/A | 15 | 33% |
| 4% MgO | Additive E | 66.6 | N/A | N/A | 15 | 100% with 36 Inversions |
| 4% MgO | Additive C | 80 | Additive A | 35.7 | 15 | 100% with 24 Inversions |
| 4% MgO | Additive D | 33.4 | Additive A | 35.7 | 15 | 100% with 34 Inversiosn |
| 4% MgO | Additive E | 22.2 | Additive A | 35.7 | 15 | 50% |
| 4% MgO | N/A | N/A | Additive A | 35.7 | 15 | <10% |
| 4% MgO | Additive C | 80 | Additive A | 1.79 | 15 | 38% |
| 4% MgO | Additive D | 33.4 | Additive A | 1.79 | 15 | <10% |
| 4% MgO | Additive E | 22.2 | Additive A | 1.79 | 15 | 20% |
| 4% MgO | N/A | N/A | Additive A | 1.79 | 15 | <10% |
| 4% MgO | Additive C | 80 | Additive B | 100 | 15 | 100% with 37 Inversions |
| 4% MgO | Additive D | 33.4 | Additive B | 100 | 15 | 12% |
| 4% MgO | Additive E | 22.2 | Additive B | 100 | 15 | 35% |
| 4% MgO | Additive B | 100 | N/A | N/A | 15 | <10% |
| 4% MgO | Additive B | 200 | N/A | N/A | 15 | <10% |

TABLE 4

4% Magnesium oxide slurry, Setting time = 51 hours

| Slurry | Additive Product | Additive Dosage (ppm) | Setting Time (Hours) | % Dispersed with 100 Inversions |
|---|---|---|---|---|
| 4% MgO | N/A | N/A | 51 | <5% |
| 4% MgO | Additive C | 80 | 51 | 17% |
| 4% MgO | Additive C | 160 | 51 | 18% |
| 4% MgO | Additive C | 240 | 51 | 48% |
| 4% MgO | Additive D | 33.4 | 51 | 11% |
| 4% MgO | Additive D | 66.9 | 51 | 18% |
| 4% MgO | Additive D | 100.3 | 51 | 41% |
| 4% MgO | Additive E | 22.2 | 51 | 10% |
| 4% MgO | Additive E | 44.4 | 51 | 17% |
| 4% MgO | Additive E | 66.6 | 51 | 35% |
| 4% MgO | Additive F | 23.5 | 51 | 12% |
| 4% MgO | Additive F | 47 | 51 | 10% |
| 4% MgO | Additive F | 70.5 | 51 | 65% |
| 4% MgO | Additive G | 25.3 | 51 | 12% |
| 4% MgO | Additive G | 50.6 | 51 | 18% |
| 4% MgO | Additive G | 75.9 | 51 | 11% |
| 4% MgO | Additive H | 23.5 | 51 | 8% |
| 4% MgO | Additive H | 47.1 | 51 | 13% |
| 4% MgO | Additive H | 70.6 | 51 | 21% |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of modifying the rheology of a lime slurry comprising the steps of:
adding a rheology modifying agent to the lime slurry, wherein the rheology modifying agent comprises a member selected from the group consisting of a high molecular weight polymer having a number average molecular weight of greater than about 200,000, and a mixture of a low molecular weight anionic polymer having a number average molecular weight of less than about 20,000 and a high molecular weight polymer having a number average molecular weight of greater than about 200,000, wherein the high molecular weight polymer is added to the lime slurry in an amount ranging from about 0.1 ppm to about 10 ppm, and wherein the high molecular weight polymer is a copolymer of acrylic acid and acrylamide.

2. The method of claim 1, wherein the rheology modifying agent is a mixture of a low molecular weight anionic polymer and a high molecular weight polymer and the low molecular weight polymer is selected from the group consisting of a mixture of a hydrolyzed polyacrylamide with a chelating agent, a terpolymer comprising acrylic acid:acrylamide:sulfonated acrylamide, and a polymaleic acid polymer.

3. A method of modifying the rheology of a lime slurry comprising the steps of:
adding a rheology modifying agent to the lime slurry, wherein the rheology modifying agent comprises a polymer having a number average molecular weight in excess of about 10,000,000, and wherein the rheology modifying agent is added to the lime slurry in an amount ranging from about 0.1 ppm to about 10 ppm, wherein the polymer comprises a copolymer of acrylic acid and acrylamide.

4. The method of claim 3, further comprising adding a chelating agent to the lime slurry.

5. The method of claim 4, wherein the chelating agent is selected from the group consisting of ethylenediaminetetraacetic acid, citric acid, ligno sulfonates, dimercaprol (2,3-dimercapto-1-propanol), prophine, and any combination thereof.

6. The method of claim 4, wherein the chelating agent is ethylenediaminetetraacetic acid.

7. The method of claim 3, wherein the rheology modifying agent comprises a copolymer of acrylic acid and acrylamide.

8. The method of claim 3, wherein the polymer has a number average molecular weight of in excess of 15,000,000, an additional polymer is added to the lime slurry, wherein the additional polymer is hydrolyzed polyacrylamide having a molecular weight in excess of 1,000,000, and the lime slurry comprises ethylenediaminetetraacetic acid.

9. The method of claim 8, wherein the additional polymer is added to the lime slurry in an amount selected from the group consisting of about 0.1 ppm to about 300 ppm, about 1 to about 100 ppm, and about 2 ppm to about 70 ppm.

10. The method of claim 3, wherein the amount of rheology modifying agent added to the lime slurry is about 0.1 ppm.

11. The method of claim 3, wherein the amount of rheology modifying agent added to the lime slurry is about 7 ppm.

12. A method of modifying the rheology of a lime slurry, comprising:
adding a rheology modifying agent to the lime slurry, wherein the rheology modifying agent is a copolymer of acrylic acid and 2-acrylamido-2-methylpropane sulfonic acid, and the rheology modifying agent is added in an amount of about 10 ppm to about 33 ppm.

* * * * *